United States Patent [19]
Wu et al.

[11] Patent Number: 5,982,360
[45] Date of Patent: Nov. 9, 1999

[54] ADAPTIVE-SELECTION METHOD FOR MEMORY ACCESS PRIORITY CONTROL IN MPEG PROCESSOR

[75] Inventors: Wen-Yi Wu, Chupei; Jyh-Shin Pan, Chutung, both of Taiwan

[73] Assignee: United Microelectronics Corp., Hsinchu, Taiwan

[21] Appl. No.: 08/941,064

[22] Filed: Sep. 30, 1997

[30] Foreign Application Priority Data

Jun. 8, 1997 [TW] Taiwan .................................. 86109102

[51] Int. Cl.$^6$ ............................... G06T 9/00; G06F 15/00
[52] U.S. Cl. ......................... 345/202; 345/501; 710/123
[58] Field of Search ................................... 345/418, 302, 345/327, 330, 501–503, 520, 521, 507, 509, 202; 395/280, 287–296, 300–303, 731, 732; 710/100, 107–116, 120, 123

[56] References Cited

U.S. PATENT DOCUMENTS

| | | | |
|---|---|---|---|
| 5,675,390 | 10/1997 | Schindler et al. ...................... | 348/552 |
| 5,754,801 | 5/1998 | Lambrecht et al. ..................... | 395/308 |
| 5,805,840 | 9/1998 | Dutton .................................... | 395/296 |
| 5,815,634 | 9/1998 | Daum et al. ............................. | 386/96 |

*Primary Examiner*—U. Chauhan
*Attorney, Agent, or Firm*—Rabin & Champagne, P.C.

[57] ABSTRACT

An adaptive-selection method for memory access priority control in MPEG processor. The processor has functional modules that include an input interface, a CPU, an audio decoder, a video decoder, an audio processor, a video processor and a memory controller. Each of the modules gains control over the data bus via arbitration by the memory controller for accessing the memory. The access priority of the CPU to the data bus is maintained at a relatively lower level except when the CPU needs to perform parsing on the MPEG compressed data and implementing the initial decoding of the audio compressed data. The use of data bus bandwidth is therefore balanced among all the system resources thereby increasing the overall system performance.

15 Claims, 3 Drawing Sheets

ADAPTIVE-SELECTION METHOD FOR MEMORY ACCESS PRIORITY CONTROL IN MPEG PROCESSOR

BACKGROUND OF THE INVENTION

1. Field of the Invention

This invention relates in general to the memory access priority control in MPEG (Motion Picture Experts Group) circuitry, and in particular to an adaptive-selection method for memory access priority control in an MPEG processor. More particularly, this invention relates to an adaptive-selection method for dynamic control of memory access priority in an MPEG processor for improving decompression performance by reducing unnecessary takeover of the system resource.

2. Description of the Related Art

As a result of advancements in fields including the digital signal processing technology, material science, as well as laser engineering, storage and retrieval of audio and video signals in digital format have become the selection of nature for high-fidelity sound and motion picture reproduction industry. In the broadcast of entertainment programs, there has been the similar trend of change toward digital format and away from the aging analog format that laid its technological basis several decades ago.

Due to the huge installation base of analog receiver equipment at the consumer end such as television sets and radio receivers, other than the last segment of signal transmission to the subscriber end is still implemented in the analog scheme. There has been the ever popular use of digital format when the program signal is manipulated or processed, either in the process of storage/retrieval or transmission. For example, satellites broadcast digital signals to ground stations, which then convert and relay the program signal in analog to the subscribers' houses via the cable network. There has even been several proposed standards for all-digital broadcast systems such as those incorporated with the widely expected High-Definition TV (HDTV). The above-mentioned trend of switching away from the analog toward the digital processing scheme is, based on what is currently available. The technology of digital storage and retrieval for audio and video signals is better than its analog counterpart and provides much better results. Digital processing provides virtually the only means for superior quality of sound and video reproduction in the cost-effective manner that human physical perception capabilities of both hearing and vision can demand.

Among the various digital signal compression/decompression schemes, MPEG standard, either MPEG-I or MPEG-II, emerges as one of the most promising and widely-accepted in the multimedia industry. At the signal decompression, namely, the reproduction end, like many others, the MPEG scheme relies on the use of digital signal processing (DSP) circuit elements to implement data retrieval for the playback of programs from a source that supplies signals containing compressed audio and video data. The source of compressed data for the MPEG processor circuitry in a playback device may be, for example, the latest members in the popular Compact Disc (CD) family of data storage formats that include the Video CD (VCD) or the Digital Video Disc (DVD). Or, the MPEG processor circuitry may also receive its compressed data signal source from a digital broadcast station.

To implement the audio and video signal reproduction utilizing compressed data fetched from signal sources in a multimedia application that employs the MPEG standard, dedicated digital electronic hardware circuitry known as MPEG processors must be used. These MPEG processors may be constructed utilizing digital circuitry elements built around digital signal processors and microprocessors that execute a firmware scheme for the implementation of the MPEG decompression operation. Memory resources are also used in the process of implementing the MPEG decompression. In fact, MPEG processors rely heavily on the use of memory subsystems as the multimedia data is being decompressed for program playback.

However, conventional hardware modules in the digital electronic circuitry that implements the MPEG standard of audio and video signal decompression employ a fixed memory access priority in a small and self-sustained firmware system. In such conventional MPEG systems, utilization of system resources can not be optimized to take full advantage of the supported bandwidth of the data bus that links the CPU, the DSP (digital signal processor), the memory and the supporting logic circuitry of the system together. As is familiar to persons skilled in the art of digital processing, unbalanced use of resources in a digital system can be translated directly into the waste of overall system power. Increase of the performance capabilities of many of the constituent parts in the system will be necessary. Such performance increase is necessary in order to achieve the same level of system processing capability as that which has well balanced use of resources. In other words, an MPEG system conducting unbalanced usage of resources (including the bus bandwidth) among all the constituent modules would require the use of either more powerful CPU, DSP, or other circuitry when compared to the one that has well-balanced system resource utilization.

In particular, in the case of MPEG decompression operation, if the memory access priority is fixed among all the functional modules in the MPEG processor, there would be a phenomenal wastes of memory bus bandwidth as the CPU is trapped in an endless scanning firmware loop. On the other hand, whenever any module in the MPEG processor requires access to resources over the system bus, it is frequently the situation that the bus is occupied. In this case, the requesting module has in a be put to waiting status. The result is that the system spends considerable time for the controlling CPU to execute its polling, while the DSP section of the system jams along the way trying to gain access to the bus for accessing data in the memory subsystem.

SUMMARY OF THE INVENTION

It is therefore an object of the invention to provide an adaptive-selection method for memory access priority control in an MPEG processor for achieving more balanced utilization of memory bus bandwidth.

It is another object of the invention to provide an adaptive-selection method for memory access priority control in an MPEG processor that achieves more balanced utilization of memory bus bandwidth for improving overall MPEG decompression performance ratings.

It is yet another object of the invention to provide an adaptive-selection method for memory access priority control in an MPEG processor that achieves more balanced utilization of memory bus bandwidth by dynamic priority adjustment of access rights to the system bus for improving overall MPEG decompression performance ratings.

The present invention achieves the above-identified objects by providing an adaptive-selection method for memory access priority control in an MPEG processor. The processor has functional modules that include a CPU for parsing the audio compressed data and the video compressed data from the MPEG compressed data, and a memory controller is used to arbitrate the access priority of each of the modules over the data bus for accessing the memory. The access priority of the CPU to the data bus is maintained at a relatively lower level except when the CPU needs to perform parsing on the MPEG compressed data and implementing the initial decoding of the audio compressed data. The use of data bus bandwidth is therefore balanced among all the system resources thereby increasing the overall system performance.

BRIEF DESCRIPTION OF THE DRAWINGS

Other objects, features and advantages of the invention will become apparent by way of the presentation of the following detailed description of the preferred but non-limiting embodiments. The description is made with reference to the accompanying drawings in which.

DESCRIPTION OF THE PREFERRED EMBODIMENT

Figure 1:
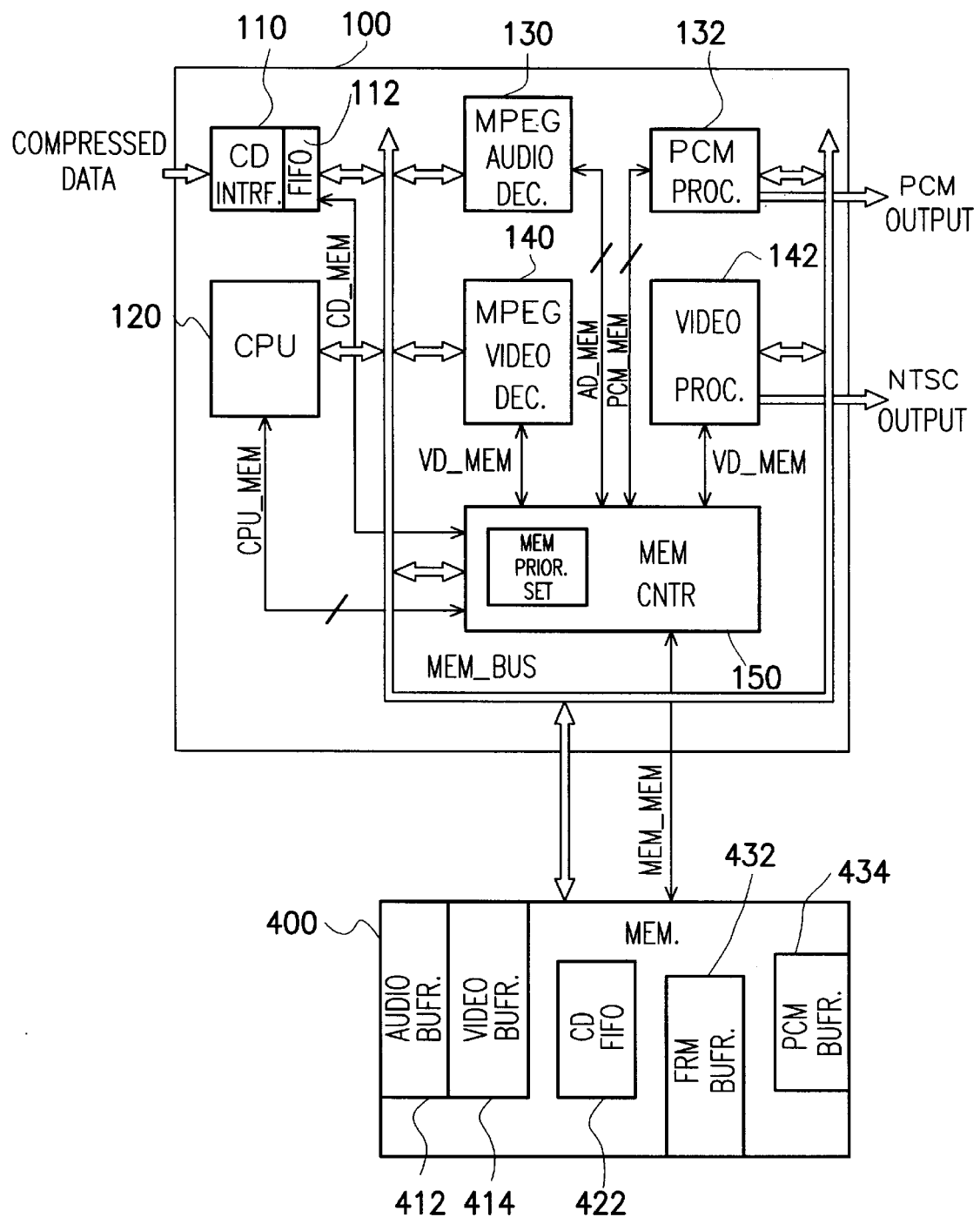
FIG. 1 is a block diagram showing the internal configuration of an MPEG processor.

Refer to FIG. 1, a block diagram is shown depicting the internal configuration of a typical MPEG processor. Hardware circuitry structural configuration and general operation of such an MPEG processor is examined for the purpose of the description of the invention.

As is illustrated in the block diagram, an MPEG processor, designated by the reference numeral 100, generally has a number of functional modules inter-linked together by a data bus and a network of several control signal lines. The MPEG processor 100 receives input compressed data complying to the MPEG compression standard at one end, and produces decompressed audio and video program signals at the other end after processing.

In the illustrated example, the MPEG processor 100 receives a string of compressed data from a CD compatible device, which may be a VCD or a DVD, and generates PCM signal as audio output, and NTSC signal as video output. As is well known, input to the MPEG processor 100 may also come from a multimedia signal source such as a broadcast station transmitting digital signals complying to the MPEG standard. On the other hand, the video output signal as generated by the MPEG processor 100 may be a PAL signal or may also be in the form of, for example, the standard VGA format popular in the personal computer industry. This video output signal can then be relayed to appropriate circuitry for further processing and display.

In the hardware configuration of FIG. 1, the MPEG processor 100 operates to decompress its received MPEG data in cooperation with a memory system, identified by the reference numeral 400 in the drawing. In this described example, the memory blocks in the memory system 400 necessary for the implementation of MPEG decompression scheme is physically independent from the MPEG processor 100. The MPEG processor 100 accesses the memory 400 via the data bus connecting between the two. As persons skilled in the art should all be well aware, this use of memory block arrangement physically external to the MPEG processor is not absolutely necessary. The inclusion of working memory blocks internal to the MPEG processor is also possible. In the case of the illustrated example of FIG. 1, in one particular situation, the MPEG processor 100 can be one incorporated in the VCD (or DVD) drive subsystem installed to the expansion bus of a personal computer system. This specific arrangement may take a designated memory segment of the addressable memory space in the host computer system as the working memory area.

The MPEG processor 100 as illustrated in FIG. 1 has a CD interface module 110 that is used as the interface between the processor itself and the MPEG compressed signal source. This signal source can be a CD compatible device of either VCD or DVD, as in this described example. Under normal situations, the CD interface 110 receives data signals prepared in the MPEG compressed format that is transmitted in serial. This is because standard CD-compatible drives, like many other magnetic media-based drives, access data stored on the surface of the storage media thereof in a stream of single bits. Though not shown in the drawing, the CD interface 110 may thus include serial-to-parallel conversion circuitry that converts the received serial data into parallel for subsequent processing in the processor internal circuitry as per the specification of the MPEG standard. The input data thus processed is then buffered in a FIFO (first-in first-out) 112 and can then be cranked out to the subsequent circuitry module in the processor 100 for further processing.

The CD interface 110 is linked to the rest of the circuitry of the MPEG processor 100 via a data bus MEM_BUS. Essentially, in the depicted example, the memory system 400 that serves as the working memory for the processor reside on the data bus MEM_BUS, as is seen in the drawing. The major functional circuitry modules of the MPEG processor 100 also reside on this data bus so as to be able to access the system memory 400 as they operate. The bi-directional indication of the bus segments leading in and out of the functional modules in the drawing schematically points out the fact that data are transmitted bi-directionally, as the need arises.

The functional modules in the MPEG processor 100, other than the CD interface 110 that provides an input interface to the system, include a CPU 120, an MPEG audio decoder 130, a PCM processor 132, an MPEG video decoder 140, a video processor 142, and a memory controller 150. As mentioned, these modules reside on the data bus MEM_BUS, allowing access to the system memory 400 as the MPEG processor 100 operates to generate audio and video outputs from the MPEG data received over the external source via the CD interface 110.

The CPU 120 may be a microprocessor or microcontroller that executes a firmware routine for coordinating the operation of the functional modules in the MPEG processor 100 in the process of MPEG data decompression. Once the routine is started, the CPU 120 coordinates all the functional modules in a preprogrammed priority scheme that allows each of the modules to access the memory resource when required under control of the memory controller 150. When the memory controller 150 grants the right of access to the memory resource 400 via the data bus MEM_BUS based on the prioritized scheme to any module, the module, namely any selected one among the CD interface 110, the MPEG audio decoder 130, the PCM processor 132, the MPEG video decoder 140, the video processor 142 and the CPU 120, is then allowed to access the memory resource 400 independently.

As persons skilled in the art should all be familiar with, multiple devices residing on a common data bus are allowed to access the shared target memory resource one at a time. This is a process of competition over the access right to the data bus MEM_BUS conducted under the set scheme of priority determination. In the conventional MPEG processors, this scheme is a fixed method. Such prior-art priority scheme requires the controlling element, the memory controller 150 in the case of the discussed hardware configuration of FIG. 1, to monitor the requesting status of all the functional modules, and grants the access right to the data bus for memory access based on the priority method embedded in the firmware routine.

In the case of the depicted hardware configuration example of FIG. 1, the functional modules in the MPEG processor 100 are coordinated under arbitration by the memory controller 150 to gain access over the data bus MEM_BUS in an orderly manner. It should be pointed out that each of the functional modules in the MPEG processor 100, in addition to being tied to the memory resource 400 via the data bus MEM_BUS, is also equipped with additional handshaking control signal lines connected to the memory controller 150. These control lines facilitate the control of each of the modules' access operations to the memory resource.

The CPU 120 in the MPEG processor 100 is also responsible for the parsing of the MPEG compressed data into the audio, video and other supporting data segments constituting the compressed data complying to the MPEG standard. In the depicted hardware example of FIG. 1, the CD interface 110, as described above, receives the serial bit stream of compressed data from the external source, and then stores the received MPEG-compressed data in the CD FIFO 422 of the memory resource 400. As described, this process requires the coordination by the memory controller 150. Then, under control of the firmware routine, the CPU 120 also implements parsing on the data retrieved from the CD FIFO 422, and then stores the generated audio and video compressed signals in the audio buffer 412 and the video buffer 414 respectively.

On the other end, the MPEG audio decoder 130 and the MPEG video decoder 140 substantially play the role of audio and video DSP that actually crunch their respective data for decoding to obtain the corresponding audio and video data in the uncompressed format. As is well known, these operations involves the use of decoding algorithms.

For example, when the MPEG video decoder 140 requests access to the memory resource 400, it flags the requesting signal over the VD_MEM control lines to the memory controller 150. The memory controller 150, upon receiving the request, arbitrates based on the predetermined memory access priority scheme. If the arbitration result as achieved by the memory controller 150 is to grant the access to the data bus MEM_BUS, MPEG video decoder 140 may then initiate its memory access in the memory resource 400 via the data bus MEM_BUS. The MPEG video decoder 140 may then, for example, retrieve the data stored in the designated location, the video buffer 414 in the memory resource 400, for performing the processing of the compressed video data which were previously parsed and written in video buffer 414 by the CPU 120. On the other hand, the MPEG video decoder 140 may, for example, also store its generated data to the designated location, the frame buffer 432 in the memory resource 400. And, this data stored in frame buffer 432 may later be retrieved by the video processor 142 in a similar manner involving the arbitration of the memory controller 150. The video processor 142 may then output its generated result as the video output, an NTSC signal in the case of FIG. 1. As is well known, the video processor 142 may then output a PAL signal in another case.

Thus, in the MPEG processor 100 having the hardware configuration outlined in FIG. 1, the CPU 120 is required to perform the parsing of the MPEG compressed data and the initial audio and video decoding in an efficient manner. In other words, the CPU 120 must be assigned high priority of access right over the data bus to conclude such parsing and initial decoding as fast as possible. As mentioned above, prior art MPEG processors facilitate this operation in a fixed priority scheme. In such fixed priority methods, once the CPU 120 is engaged in the steps of the program loop, all the functional modules in the MPEG processor 100 are not allowed to perform their respective function call operations. This fixed priority scheme suffers at least one major drawback. Namely, CPU 120 itself also consumes bandwidth of the data bus MEM_BUS as it performs its routine and accesses the memory resource 400. Therefore, there is frequently the case that the CPU 120 is trapped temporarily in the program loop scanning to see if any functional module in the MPEG processor 100 requests access to the data bus MEM_BUS. During this trapped period, all the functional modules are not allowed to perform their respective functionality as the data bus MEM_BUS has been locked up by the CPU 120. Thus, the situation frequently ends up that the MPEG processor 100 spends more time in looping than actually performing the MPEG data decompression. The overall performance of these prior art MPEG processors employing fixed priority scheme are therefore quite inefficient.

For example, due to the fact that CD drives (including VCD and DVD, the latest members developed out of the very original CD family) outputs data in serial format, it is very likely that an empty CD FIFO 422 in the memory resource 400 constitutes the bottleneck of the internal operations in the entire MPEG processor 100. A bottleneck is formed in such a situations since the fixed priority method adopted by these prior-art MPEG processors does not have the flexibility of allowing other functional modules that really need access to the data bus MEM_BUS for performing their functions. They have to rotate in the endless cycle as all the functional modules in the MPEG processor are equally assigned the same priority. This requires that each of them be rotated in a loop, and each has to follow the same sequence of steps before it can get attended to.

Figure 2:
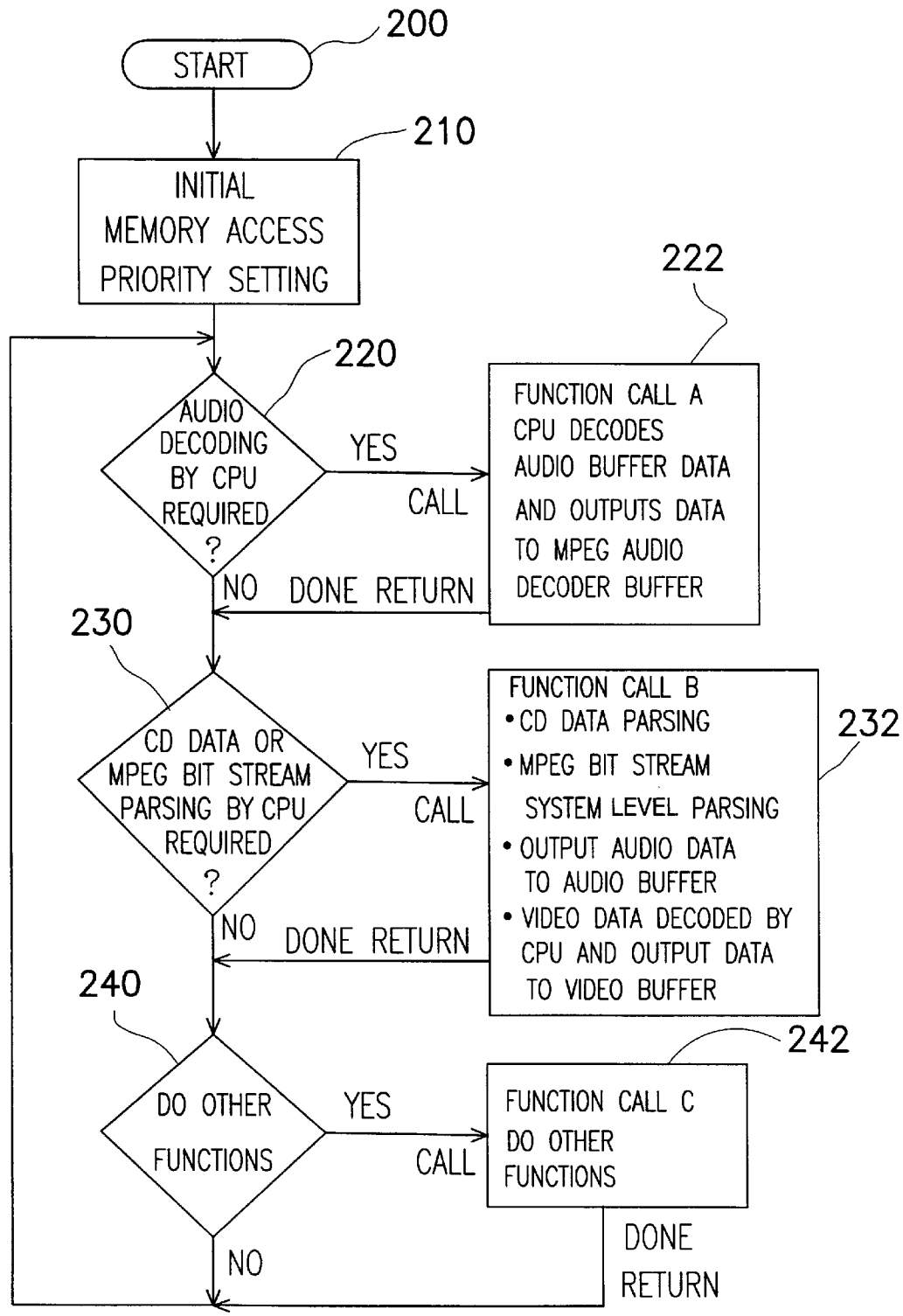
FIG. 2 is a flow chart showing the firmware routine of a conventional MPEG processor used for controlling the implementation of the decompression operation in a fixed priority scheme.

FIG. 2 shows a flow chart that outlines the firmware routine of a conventional MPEG processor operating in an endless loop. This prior-art routine is based on a fixed priority method and is used for controlling the implementation of the decompression operation performed on MPEG compressed data received from an external means. As is illustrated in FIG. 2, this prior-art firmware routine executed by the CPU 120 in the hardware configuration of FIG. 1 is a continuous loop that starts at step 200 and cycles from step 220. Specifically, when the routine starts at step 200, the MPEG processor 100 sets up the initial conditions for the priority scheme for all the functions to be performed by the processor in the process of implementing MPEG decompression at step 210.

In the prior-art endless routine of FIG. 2, all the functional modules in the MPEG processor 100, including CD interface 110, MPEG audio decoder 130, PCM processor 132, MPEG video decoder 140, video processor 142 and CPU 120, are all arbitrated by the memory controller 150 when the need to access the data bus MEM_BUS arises. Since the memory access priority has been set in step 210, and no further step alters this priority, all the basic functionality of the compressed data parsing, as well as the audio data and the video data decoding, are allowed to enjoy the same un-altered priority level.

In FIG. 2, the cycling routine first checks to see if the audio decoding functionality is necessary at step 220. For this decision-making step, CPU 120 determines whether or not it is necessary to perform audio decoding. If CPU 120 determines in step 220 that audio decoding is required the routine jumps to step 222, where the endless routine branches out of the loop temporarily to perform a function call by executing a subroutine, namely function call A as identified in this step block. In this called subroutine, CPU 120 decodes the data corresponding to the compressed audio data stored in the memory resource 400. After decode, CPU 120 then outputs the decoded compressed audio data to the memory resource. This is implemented by the CPU 120 via access to the data bus MEM_BUS by the memory controller 150. After this, the program subroutine generally outlined in the program step 222 can be concluded, and program control may then be returned back to the main cycling loop. In other words, the loop transfers to step 230 for further processing.

If, on the other hand, CPU 120 determines in step 220 that it is not necessary to perform initial audio decode, the routine of FIG. 2 will then proceed to step 230.

At step 230, in a similar manner, CPU 120 determines whether or not the CD data or MPEG bit stream as extracted from the external source by the CD interface 110 of the MPEG processor 100 should be parsed. If the functionality is requested via proper flagging, CPU 120 then branches out of the main program loop again and coordinates to perform a series of operations identified as function call B outlined in the program step 232. These include CPU 120 parsing the CD data obtained via the CD interface 110. The MPEG bit stream is also subject to system level parsing. The data corresponding to the audio compressed data obtained as a result of the MPEG parsing operation is then output to the memory resource 400. The parsed video data is also decoded by the CPU 120, followed by the initial video decoding, and the result is then output to the video buffer 414 in memory 400. Then, program transfer is again returned to the main loop, and continues to proceed at step 240.

If the system determined that the program branch to function call B at step 230 is not necessary, the main cycling loop then advances to step 240. The routine determines at step 240 whether or not further MPEG decompression functionality generally outlined in the branched step 242 function call C as is necessary to be performed by the CPU 120. If yes, the CPU 120 coordinates to proceed the program branching accordingly and then returns to the main loop. If the result of decision is negative, the loop just maintains in the main program cycle and gets back to step 220, where the routine cycle is repeated again.

In the firmware routine of FIG. 2 for the conventional MPEG processor, the services to the function call subroutines branched out of the main cycling loop, namely operations outlined in steps 222, 232 and 242, are arranged in the fixed scheme of attendance. As mentioned above, there is considerable time wasted in cycling through the main program loop as function calls A, B and C would have to be cycled several times before the service modules of any of them can actually be executed.

Figure 3:
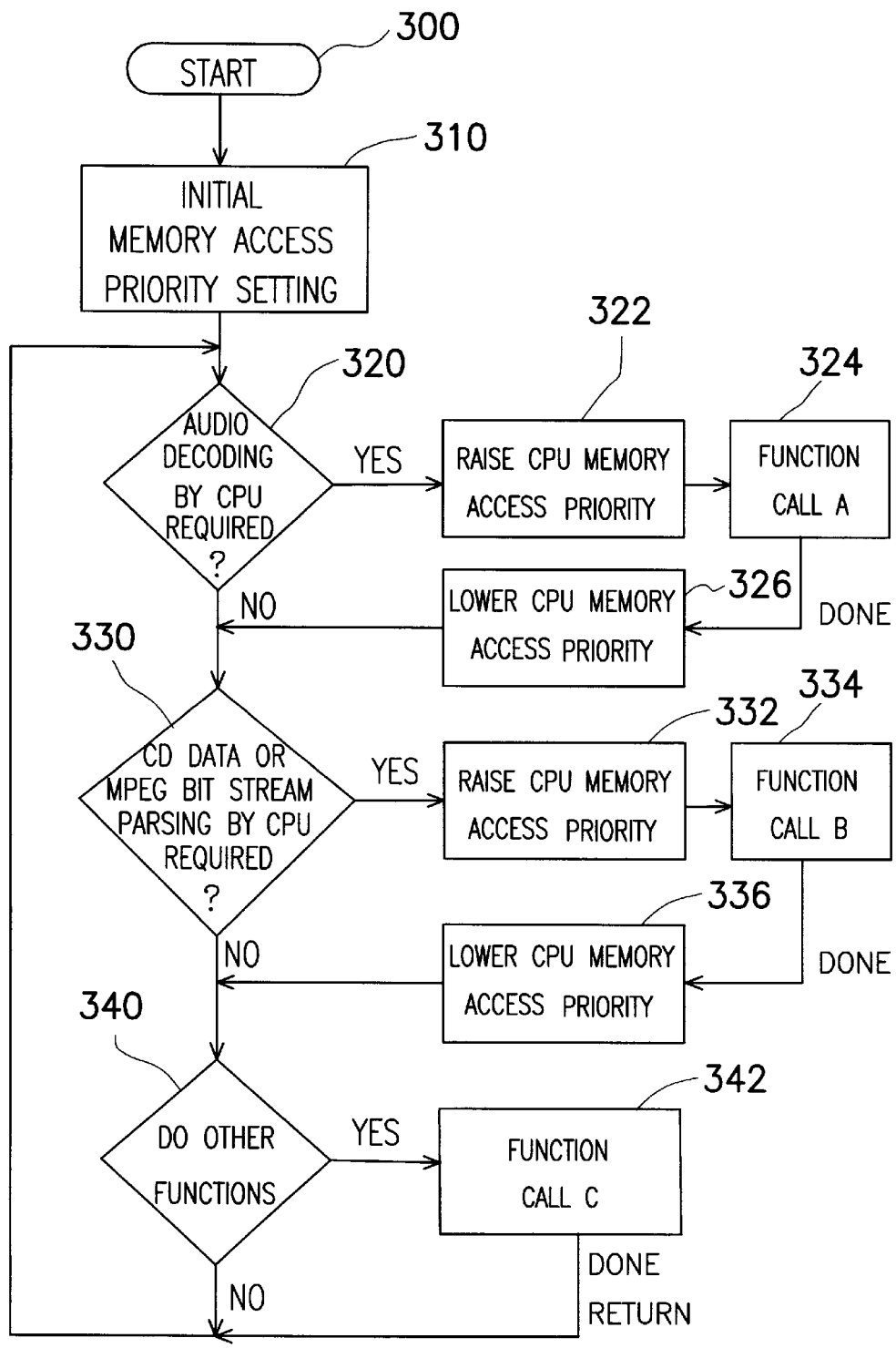
FIG. 3 is a flow chart showing the firmware routine in accordance with the preferred embodiment of the present invention for an MPEG processor used for controlling the implementation of the decompression operation in an adaptive-select priority scheme.

An embodiment of the invention as demonstrated in the flow chart of FIG. 3 has a dynamic service priority assignment scheme to improve the effective service duty cycle of the MPEG processor firmware routine, thereby promoting the overall MPEG decompression efficiency. As is illustrated in FIG. 3, the flow chart shows the firmware routine in accordance with the preferred embodiment of the present invention for an MPEG processor. This routine is used for controlling the implementation of a decompression performed on the compressed data that complies with the MPEG standard.

For a detailed description of the firmware routine outlined in the flow chart of FIG. 3, still consider the use of an MPEG processor 100 as illustrated in FIG. 1. As is illustrated, this exemplified firmware routine executed by the CPU 120 in the hardware configuration of FIG. 1 is also built around a continuous program loop that cycles from step 320 once started at step 300. Specifically, when the routine starts at step 300, the MPEG processor 100 establishes the initial conditions for the priority scheme of memory access for all the functions to be performed in the processor in the process of implementing the MPEG decompression. Note, however, that this set of priority condition is only the initial setting, parameters of which will be dynamically adjusted as the operation of the MPEG processor 100 performs its tasks.

As seen in FIG. 3, the cycling main routine first checks to see if the audio decoding functionality is necessary at step 320. For this decision-making step, if the CPU 120 determines that there is the need to implement the initial audio decoding, the firmware routine jumps to step 322, where the access priority of the CPU 120 to the data bus MEM_BUS is raised. The priority is raised with respect to the original level as set up in step 310 when the routine was initially started. Then, the routine proceeds to step 324, where a function call identified as function call A is performed by executing a corresponding function subroutine. Similar as in the case described above for the prior-art routine, CPU 120 decodes the data corresponding to the audio compressed data stored in the memory resource 400, and then stores the result in the memory resource 400 again. This is facilitated by CPU 120 governing the access to the data bus MEM_BUS via control by the memory controller 150. After this, the program subroutine generally outlined in the program step 324 can be concluded and program control may then be transferred to step 326, where the priority level assigned to the CPU 120 for accessing the memory resource 400 via control over the data bus MEM_BUS is lowered. At this moment, the CPU priority for requesting service via the data bus can be lowered to a level lower than the initial setting. Then, the firmware routine transfers to step 330 for subsequent MPEG decompression processing.

On the other hand, if initial audio decoding is determined by the CPU 120 at step 320 to be unnecessary, the routine of FIG. 3 will then proceed directly to step 330.

At step 330, in a manner similar to that at step 320, CPU 120 determines whether or not service to another functional subroutine is demanded. For example, step 330 determines whether or not the CD data or MPEG bit stream as extracted from the external source by the CD interface 110 of the MPEG processor 100 should be parsed. If the functionality is requested via proper flagging, the routine then proceeds to step 332 to raise the priority level for the CPU 120 to access the data bus MEM_BUS. The priority is raised with respect to the original level as set up in step 310 when the routine was initially started. Then, the routine proceeds to step 334, where a function call identified as function call B is performed by executing a corresponding function subroutine.

Again, similar as was the case described above for the prior-art routine, dedicated functional operations required in the process of implementing the MPEG data decompression can be performed in this subroutine. For example, in this called subroutine, the operations include CPU 120 parsing the CD data obtained via the CD interface 110. The MPEG bit stream is also subject to system level parsing. The data corresponding to the audio compressed data obtained as a result of the MPEG parsing operation is then output to the memory resource 400. The video data is parsed, and then the initial video decoding performed by the CPU 120, and the obtained data is output to the video buffer 414 in memory 400. Then, the program control is transferred to step 336, where the CPU priority for accessing the memory resource 400 over the data bus MEM_BUS is lowered to normal. After this step, the routine continues at step 340.

If, however, the system determines that the program branch to service function call B at step 330 is not necessary, the main cycling loop then advances to step 340. The routine determines at step 340 whether or not further MPEG decompression functionality generally outlined in the branched step 342 as function call C is necessary to be performed by the CPU 120. If yes, the CPU 120 coordinates to proceed the branching accordingly and then returns to the main loop. If the decision is negative, the loop just maintains in the main program cycle and gets back to step 320, where the routine cycle is repeated again.

In the firmware routine of FIG. 3 depicting a preferred embodiment of the invention for operating the MPEG processor, the services to the function call subroutines branched out of the main cycling loop, namely operations outlined in steps 324, 334 and 342, are arranged in a dynamic scheme of attendance priority. The CPU priority to access the memory resource 400 via the data bus MEM_BUS is only raised to a level higher than normal when it is necessary, and during all other time periods when it is unnecessary for the CPU 120 to take control over the data bus, its access priority is lower then normal. As a result, this prevents the situation in which the CPU is inadvertently occupying the data bus MEM_BUS when it is not actually necessary. That is, simply because the rotation of the priority list happens to be pointing to the CPU 120 does not imply that the data bus should be rendered useless while some other functional module is seeking to gain control. In the depicted flow chart of FIG. 3, even though the main cycling loop of firmware routine is pointing to the CPU 120 when it is not necessary to have the data bus MEM_BUS access right granted, there will be no obstacle for other functional modules in the MPEG processor 100 to gain access over the memory resource 400. This is because the CPU priority has been maintained at its relatively low level. Thus, the overall MPEG decompression performance can be substantially improved over that of the prior art method.

While the invention has been described by way of example and in terms of preferred embodiment, it is to be understood that the invention need not be limited to the disclosed embodiments. On the contrary, it is intended to cover various modifications and similar arrangements included within the spirit of the appended claims, the scope of which should be accorded the broadest interpretation so as to encompass all such modifications and similar structures.

What is claimed is:

1. An adaptive-selection method for memory access priority control in an MPEG processor that includes:

an input interface for receiving MPEG compressed audio and video data;

a central processing unit for parsing the MPEG compressed audio and video data to obtain parsed compressed audio and parsed compressed video data;

an audio decoder for decoding the parsed compressed audio data to obtain decoded audio data;

a video decoder for decoding the parsed compressed video data to obtain decoded video data;

an audio processor for generating audio output signals from the decoded audio data;

a video processor for generating video output signals from the decoded video data;

a memory controller;

a memory for storing the MPEG compressed audio and video data, the parsed compressed audio data, the parsed compressed video data, the decoded audio data, and the decoded video data; and a data bus linking the input interface, the central processing unit, the audio decoder, the video decoder, the audio processor, the video processor, the memory controller, and the memory together for communicating therebetween, wherein the memory controller controls access to the data bus;

the adaptive-selection method comprising;

establishing an initial access priority of the central processing unit to the data bus; and performing a continuous routine including determining if the central processing unit is required to perform initial audio decoding;

if the central processing unit is required to perform initial audio decoding, raising the access priority of the central processing unit to the data bus, performing initial audio decoding, and lowering the raised access priority after the performing initial decoding of the audio data;

determining if the central processing unit is required to parse the MPEG compressed audio and video data; and if the central processing unit is required to parse the MPEG compressed audio and video data, raising the access priority of the central processing unit to the data bus, implementing parsing of the MPEG compressed audio and video data by the central processing unit, and lowering the raised access priority after the implementing parsing.

2. The adaptive-selection method of claim 1, wherein the implementing parsing of the MPEG compressed audio and video data further comprises:

the central processing unit retrieving the MPEG compressed audio and video data stored in the memory via the data bus for parsing to generate the parsed compressed audio data and the parsed compressed video data;

storing the parsed compressed audio data in the memory via the data bus;

initial decoding of the parsed compressed video data to obtain the decoded video data; and storing the decoded video data in the memory via the data bus.

3. The adaptive-selection method of claim 2, wherein the performing initial audio decoding further comprises:

the central processing unit retrieving the parsed compressed audio data stored in the memory via the data bus for initial decoding of the parsed compressed audio data to generate the decoded audio data; and storing the decoded audio data in the memory via the data bus.

4. The adaptive-selection method of claim 3, wherein the input interface is a CD interface for receiving MPEG compressed data generated by a Video Compact Disc.

5. The adaptive-selection method of claim 3, wherein the input interface is a CD interface for receiving MPEG compressed data generated by a Digital Video Disc.

6. The adaptive-selection method of claim 4, wherein the CD interface further comprises a serial-to-parallel converter for converting the MPEG compressed data generated by the Video Compact Disc from serial format into parallel format.

7. The adaptive-selection method of claim 5, wherein the CD interface further comprises a serial-to-parallel converter for converting the MPEG compressed data generated by the Digital Video Disc from serial format into parallel format.

8. The adaptive-selection method of claim 3 wherein the input interface is a digital broadcast receiving interface for receiving compressed data generated by a digital broadcast station.

9. The adaptive-selection method of claim 3, wherein the audio processor is a PCM processor for generating PCM output as the audio output signal.

10. The adaptive-selection method of claim 3, wherein the video processor is an NTSC processor for generating NTSC output as the video output signal.

11. The adaptive-selection method of claim 3, wherein the video processor is a PAL processor for generating PAL output as the video output signal.

12. The adaptive-selection method of claim 3, wherein the video processor is a VGA processor for generating VGA output as the video output signal.

13. An adaptive-selection method for controlling a priority for gaining access to a data bus for each of various components of an MPEG processor for receiving MPEG compressed data including at least MPEG compressed audio data, the method comprising:

establishing an initial, relatively low, priority for a central processing unit to access the data bus; and performing a continuous routine including
      determining whether initial audio decoding is required to be performed on MPEG compressed audio data received by the MPEG processor;

if initial audio decoding is required, raising the priority of the central processing unit to a second, relatively high, priority, performing initial audio decoding on the MPEG compressed audio data to generate decoded compressed audio data, and lowering the second priority to a third, relatively low, priority after the performing initial audio decoding;

determining whether the MPEG compressed data received by the MPEG processor includes MPEG compressed video data in addition to MPEG compressed audio data; and if the MPEG compressed data includes MPEG compressed video data, raising the priority of the central processing unit to a fourth, relatively high, priority, parsing the MPEG compressed audio and video data to generate parsed audio data and parsed video data, and lowering the fourth priority to a fifth, relatively low, priority after the parsing.

14. The adaptive-selection method of claim 13, wherein the parsing the MPEG compressed audio and video data further comprises:

retrieving the MPEG compressed audio and video data stored in a memory via the data bus;

storing the parsed audio data in the memory via the data bus;

initial decoding of the parsed video data to obtain decoded video data; and storing the decoded video data in the memory via the data bus.

15. The adaptive-selection method of claim 13, wherein the performing initial audio decoding further comprises:

retrieving the MPEG compressed audio data stored in a memory via the data bus; and storing the decoded compressed audio data in the memory via the data bus.

* * * * *